(12) United States Patent  (10) Patent No.: US 7,105,119 B2
Kanie et al.  (45) Date of Patent: Sep. 12, 2006

(54) METHOD OF FORMING INTEGRALLY MOLDED CLIP

(75) Inventors: Hideki Kanie, Toyohashi (JP); Yoshimichi Matsudaira, Toyohashi (JP); Kazuya Edamatsu, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/922,288

(22) Filed: Aug. 19, 2004

(65) Prior Publication Data

US 2005/0019130 A1 Jan. 27, 2005

Related U.S. Application Data

(63) Continuation of application No. PCT/US03/05465, filed on Feb. 21, 2003.

(30) Foreign Application Priority Data

Feb. 22, 2002 (JP) ............................. 2002-045841

(51) Int. Cl.
*B29C 45/44* (2006.01)
(52) U.S. Cl. .................... 264/238; 264/318; 264/328.1; 264/334
(58) Field of Classification Search ................ 411/45, 411/508, 509, 510, 913; 24/453, 297; 264/238, 264/318, 328.1, 334
See application file for complete search history.

(56) References Cited

U.S. PATENT DOCUMENTS

| | | | |
|---|---|---|---|
| 2,542,144 A | | 2/1951 | Kearns |
| 3,013,308 A | * | 12/1961 | Armour ....................... 29/451 |
| 3,918,130 A | | 11/1975 | Poe |
| 3,957,944 A | * | 5/1976 | Guala .......................... 264/295 |
| 4,114,509 A | | 9/1978 | Poe |
| 4,122,583 A | * | 10/1978 | Grittner et al. ............ 24/703.1 |
| 4,276,806 A | * | 7/1981 | Morel ........................... 411/41 |
| 4,375,342 A | | 3/1983 | Wollar et al. |
| 4,375,825 A | * | 3/1983 | Greenspan ................... 137/852 |
| 4,405,272 A | * | 9/1983 | Wollar ........................... 411/41 |
| 4,571,134 A | * | 2/1986 | Beglinger et al. ............ 411/41 |
| 4,602,760 A | * | 7/1986 | Tiefenbach et al. ......... 248/544 |
| 4,637,765 A | | 1/1987 | Omata |
| 4,674,930 A | * | 6/1987 | Poe et al. ...................... 411/40 |

(Continued)

FOREIGN PATENT DOCUMENTS

JP 57-135133 * 8/1982

*Primary Examiner*—Jill L. Heitbrink
(74) *Attorney, Agent, or Firm*—Harness, Dickey & Pierce, P.L.C.

(57) ABSTRACT

A clip (8) comprises a bush (20) and a pin (10) adapted to be inserted into the bush, wherein the bush has a leg portion to be expanded in diameter so as to fasten a plurality of members together when the pin is pushed into the bush. The pin includes a flange (11), a shank (12) extending downward from the lower surface of the flange, an engagement pawl (13) connected to the shank, and a coupling pawl (14) disposed below the engagement pawl. The bush includes a ring portion (21) and a leg portion composed of a plurality of legs (23) divided by slits (25) to extend vertically downward from the lower surface of the ring portion. The pin and the bush are connected with one another through a notched thin-walled portion (29) formed between the lower end of the pin and the ring portion of the bush. The pin and the bush are assembled together in a positional relationship where the ring portion of the bush is held between the engagement and coupling pawls of the pin.

8 Claims, 14 Drawing Sheets

U.S. PATENT DOCUMENTS

| | | | |
|---|---|---|---|
| 4,687,434 A * | 8/1987 | Beglinger | 425/556 |
| 4,747,199 A * | 5/1988 | Kitchen | 29/416 |
| 4,780,037 A * | 10/1988 | Payne | 411/433 |
| 4,830,556 A * | 5/1989 | Nelson | 411/41 |
| 4,920,618 A * | 5/1990 | Iguchi | 24/453 |
| 4,927,287 A * | 5/1990 | Ohkawa et al. | 403/408.1 |
| 4,952,106 A * | 8/1990 | Kubogochi et al. | 411/48 |
| 5,163,795 A | 11/1992 | Benoit et al. | |
| 5,168,604 A * | 12/1992 | Boville | 24/297 |
| 5,200,132 A * | 4/1993 | Shfaram et al. | 264/238 |
| 5,370,484 A * | 12/1994 | Morikawa et al. | 411/48 |
| 5,375,954 A | 12/1994 | Eguchi | |
| 5,507,545 A | 4/1996 | Krysiak | |
| 5,560,575 A | 10/1996 | Krysiak | |
| 5,568,675 A * | 10/1996 | Asami et al. | 24/453 |
| 5,592,720 A * | 1/1997 | Sasakawa et al. | 24/453 |
| 5,632,581 A * | 5/1997 | Hasada | 411/48 |
| 5,775,860 A * | 7/1998 | Meyer | 411/46 |
| 5,829,910 A * | 11/1998 | Kameyama | 403/329 |
| 5,850,676 A | 12/1998 | Takahasi et al. | |
| 6,074,144 A | 6/2000 | Meyer | |
| 6,074,150 A | 6/2000 | Shinozaki et al. | |
| 6,179,539 B1 * | 1/2001 | Benoit et al. | 411/433 |
| 6,322,305 B1 | 11/2001 | Bantle | |
| 6,350,091 B1 | 2/2002 | Mehta et al. | |
| 6,364,586 B1 | 4/2002 | Okada | |
| 6,481,942 B1 | 11/2002 | Tanaka | |
| 6,514,024 B1 | 2/2003 | Akema et al. | |
| 6,533,515 B1 | 3/2003 | Meyer | |
| 6,665,914 B1 | 12/2003 | Ogawa | |
| 6,752,576 B1 * | 6/2004 | Johansson et al. | 411/21 |
| 6,769,849 B1 * | 8/2004 | Yoneoka | 411/45 |
| 2002/0026693 A1 * | 3/2002 | Akema et al. | 24/453 |
| 2003/0143053 A1 | 7/2003 | Kanie | |
| 2003/0194288 A1 | 10/2003 | Moerke et al. | |
| 2004/0091334 A1 * | 5/2004 | Hoshi | 411/508 |
| 2004/0175250 A1 * | 9/2004 | Yoneoka | 411/45 |

\* cited by examiner

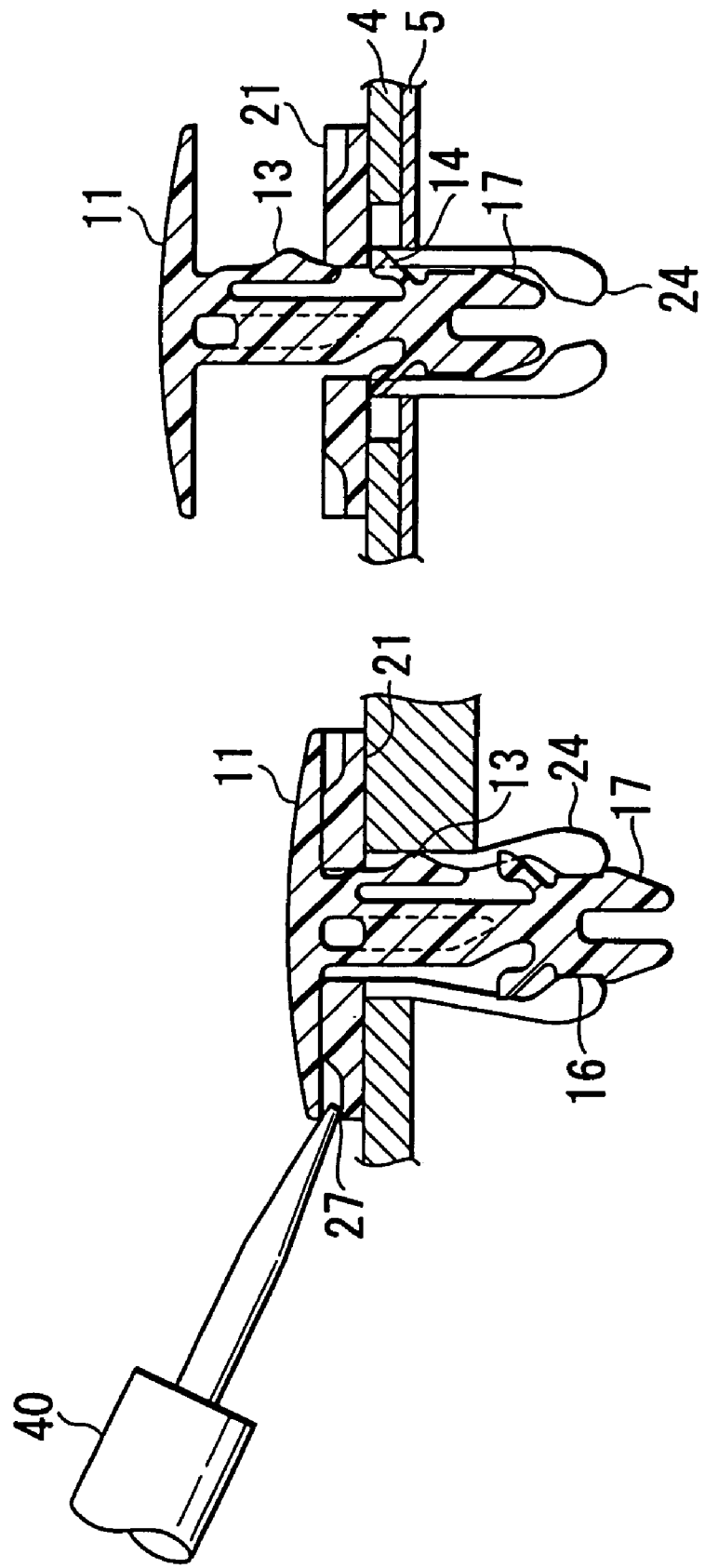

METHOD OF FORMING INTEGRALLY MOLDED CLIP

CROSS-REFERENCE TO RELATED APPLICATIONS

The present application is a continuation of pending International Patent Application No. PCT/US03/05465 filed on Feb. 21, 2003 which designates the United States, and which claims priority of Japanese Application No. 2002-045841 filed on Feb. 22, 2002. The disclosure of the above applications is incorporated herein by reference.

FIELD OF THE INVENTION

The present invention relates to a fastening clip used for fastening a component such as ornamental parts for automobiles, industrial machines or the like, to a plate member such as body panels for automobiles. In particular, the present invention relates to a clip comprising a pin and a bush, wherein the bush has a leg portion to be expanded in diameter so as to fasten a plurality of members together when the pin is pushed into the bush.

BACKGROUND OF THE INVENTION

Heretofore, a two-piece synthetic resin clip having a clip body and a pin has been used to fasten a component such as ornamental parts, to a panel such as body panels for automobiles.

The conventional two-piece clip comprises a bush having a flange and a leg extending from the lower surface of the flange, and a pin having a head and a shank extending from the lower surface of the head. In a fastening operation of this clip, a pair of plate members each formed with a mounting through-hole are first superimposed while keeping the through holes in communication with one another. Then, the leg of the bush is inserted into the mounting holes of the plate members, and the shank of the pin is pressed into the leg, so that the plate members are clamped and fastened by the bush or between the lower surface of the flange and the front end of the leg having an expanded diameter.

However, in the conventional two-piece clip, the pin and the bush are individually formed as separate parts, and then assembled together. Thus, two molding-die sets are required to form the two parts separately. While two parts can be simultaneously formed by use of a single of specific molding-die set (so-called two-part cavity die), the number of parts to be formed in each of the two-part cavity dies is inevitably reduced as compared to the method of forming two parts separately by use of two molding-die sets. In addition, it is required to sort between the pin and the bush and assemble them together in a subsequent process.

In either case of forming the pin and the bush by use of the separate molding-die sets or the single two-part cavity die, after forming the pin and the bush as separate parts, they must be assembled together.

In view of the above problems, it is therefore an object of the present invention to provide a clip comprising a pin and a bush which are capable of being integrally molded in a single molding-die set.

It is another object of the present invention to provide a clip comprising a pin and a bush which are capable of being assembled together in a single molding-die set to eliminate the need for assembling them together in a subsequent process.

SUMMARY OF THE INVENTION

According to a first aspect of the present invention, there is provided an integrally molded clip for fastening a plurality of plate members. The clip comprises a bush and a pin adapted to be inserted into the bush, wherein the bush has a leg portion to be expanded in diameter so as to fasten the members together when the pin is pushed into the bush. In this clip, the pin includes a flange, a shank extending downward from the lower surface of the flange, an engagement pawl connected to the shank, and a coupling pawl disposed below the engagement pawl. The bush includes a ring portion and a leg portion composed of a plurality of legs divided by slits to extend vertically downward from the lower surface of the ring portion.

Further, in a molded state of the clip, the pin and the bush are connected with one another through a notched thin-walled portion formed between the lower end of the pin and the ring portion of the bush.

According to a second aspect of the present invention, there is provided a clip comprising a bush and a pin adapted to be inserted into the bush, wherein the bush has a leg portion to be expanded in diameter so as to fasten a plurality of members together when the pin is pushed into the bush. In this clip, the pin includes a flange, a shank extending downward from the lower surface of the flange, an engagement pawl connected to the shank, and a coupling pawl disposed below the engagement pawl. The bush includes a ring portion and a leg portion composed of a plurality of legs divided by slits to extend vertically downward from the lower surface of the ring portion.

Further, the pin and the bush are assembled together such that the ring portion of the bush is held between the engagement pawl and the coupling pawl of the pin.

In the above clip, the ring portion of the bush may be formed with a prying slot for releasing the fastening function of the clip. In this case, when the fastening function is released, the ring portion of the bush is held between the engagement pawl and the coupling pawl of the pin.

According to a third aspect of the present invention, there is provided a method of forming an integrally molded clip including a bush and a pin adapted to be inserted into the bush which has a leg portion to be expanded in diameter so as to fasten a plurality of members together when the pin is pushed into the bush, wherein the clip has a molded state where the pin and the bush are connected with one another through a notched thin-walled portion.

This method comprises the steps of: closing a molding-die set including a fixed die, a sliding die and a movable die, and injecting a molten resin into the molding-die set; opening the molding-die set; protruding an ejector to move the clip upward; and retracting the ejector to release the clip from the molding-die set.

The above method of forming the integrally molded clip may include the step of breaking the notched thin-walled portion in the molding-die set to separate the pin and the bush from one another.

Further, the method of forming the integrally molded clip may include the step of assembling the pin and the bush together in the molding-die set such that the ring portion of the bush is held between the engagement pawl and the coupling pawl of the pin.

In the present invention, the pin and bush are integrally molded in a single molding-die set.

Further, the pin and the bush are assembled together by pushing the pin into the bush in conjunction with the motion of releasing the clip from the molding-die set. This makes it possible to eliminate the need for assembling the pin and the bush together in a subsequent process after taking out them from the molding-die set.

BRIEF DESCRIPTION OF THE DRAWINGS

FIG. 20A is a sectional view of the clip attached to plate members to fasten them together.

FIG. 20B is a sectional view of the clip in the state after the fastening between the plate members is released.

DETAILED DESCRIPTION OF THE PREFERRED EMBODIMENTS

Figure 1:
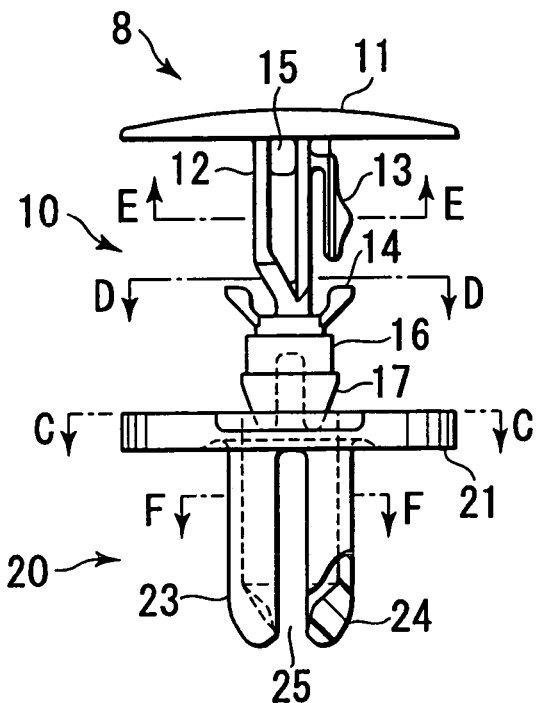
FIG. 1 is a front view of a clip according to the present invention.
Figure 2:
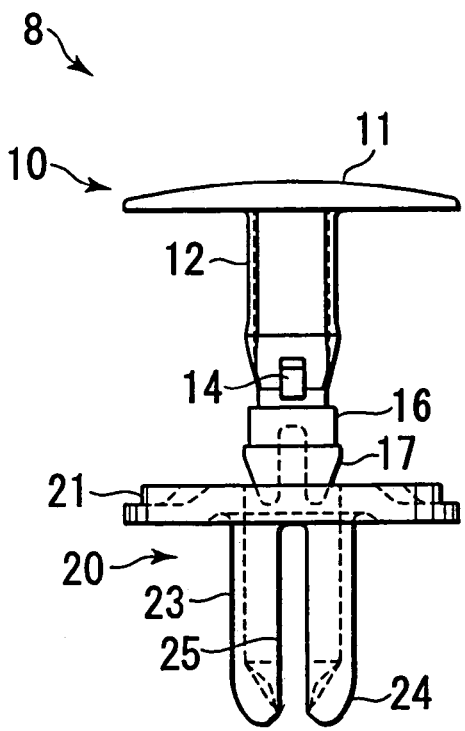
FIG. 2 is a left side view of the clip according to the present invention.
Figure 3:
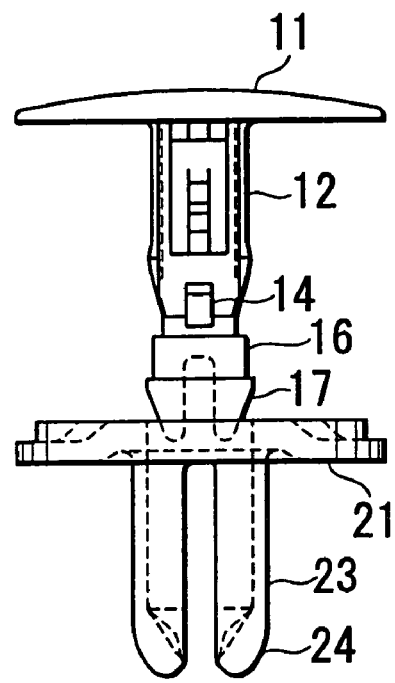
FIG. 3 is a right side view of the clip according to the present invention.

With reference to the drawings, one embodiment of the present invention will now be described.

FIGS. 1 to 5 show a clip 8 comprising a pin 10 and a bush 20. These figures show a state when the pin 10 and the bush 20 have been integrally molded.

One end of the pin 10 is formed with a circular-plate-shaped flange 11. An approximately cylindrical shank 12 extends vertically downward from the lower surface of the flange 11. The shank 12 is formed with a lightening hole 15 immediately below the flange 11. The lightening hole 15 is provided to prevent a sink mark otherwise caused in the upper surface of the flange 11 (or to maintain a good appearance).

Figure 9:
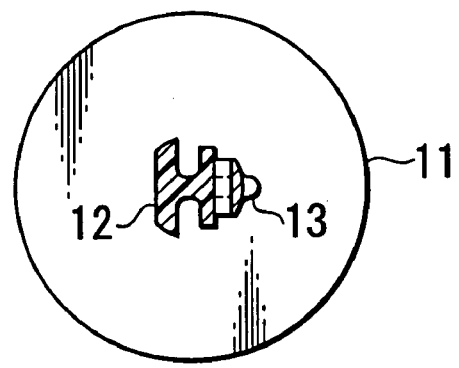
FIG. 9 is a sectional view taken along the line E—E in FIG. 1.

A single engagement pawl 13 extends downward from the outer surface of the shank 12 immediately below the flange 11. FIG. 9 shows the section of the shank including the engagement pawl 13, taken along the line E—E in FIG. 1. The engagement pawl 13 can be bent or swung about its base portion connected to the shank 12 to pass through a hole formed in a ring portion 21 of the bush 20. As described in detail later, the engagement pawl 13 is operable to prevent the pin 10 from excessively entering into the bush 20 to keep the pin 10 and the bush 20 in an assembled position where they are assembled together, when the pin 10 is inserted into the bush 20 during a process of releasing them from a molding-die set (die-releasing process). This function is required by the reason that if the pin 10 excessively enters into the bush 20, a leg portion of the bush 20 is undesirably expanded in diameter to preclude an operation of inserting the bush 20 into holes of plate members.

The shank 12 is also formed with a pair of coupling pawls 14 disposed below the engagement pawl 13. The coupling pawls 14 are formed to extend upward from the base portion of the shank 12 at a relatively wide inner angle therebetween, and to have an adequate rigidity in a fastening position where the clip is attached to the plate members to fasten them. The distance between two ends of the coupling pawls 14 is larger than the inner diameter of the ring portion 21 of the bush 20. As described in detail later, in the assembled position, the coupling pawls 14 contact the lower surface of the ring portion 21 to prevent the separation between the pin 10 and the bush 20. Even when the clip is detached from the plate members after its long-term use, the coupling pawls 14 can be kept in contact with the lower surface of the ring portion 21 to prevent the separation between the pin 10 and the bush 20.

The shank 12 has a cylindrical contact surface 16 disposed below the coupling pawls 14.

The shank 12 also has an approximately cone-shaped inclined portion 17 disposed below the contact surface 16.

Figure 6:
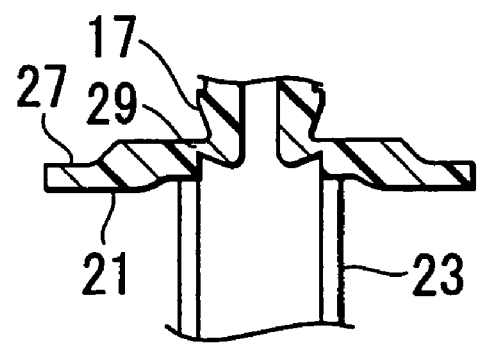
FIG. 6 is a sectional view taken along the line A—A in FIG. 4.

In this embodiment of the present invention, the clip includes the bush 20 having an upper portion formed as the approximately disk-shaped ring portion 21. The ring portion 21 is formed with an approximately circular hole at the center thereof. This hole has a diameter allowing the shank 12 to pass therethrough. As shown in FIG. 6 which is the sectional view taken along the line A—A in FIG. 4, the ring portion 21 has an upper surface formed with a prying slot 27 for allowing a screwdriver to be inserted thereinto.

Figure 4:
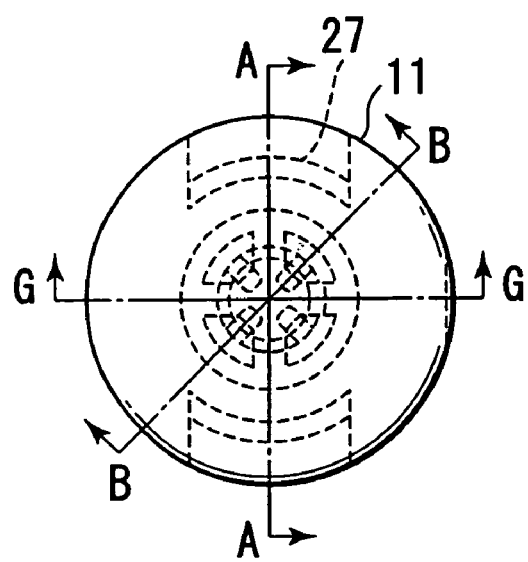
FIG. 4 is a top view of the clip according to the present invention.
Figure 5:
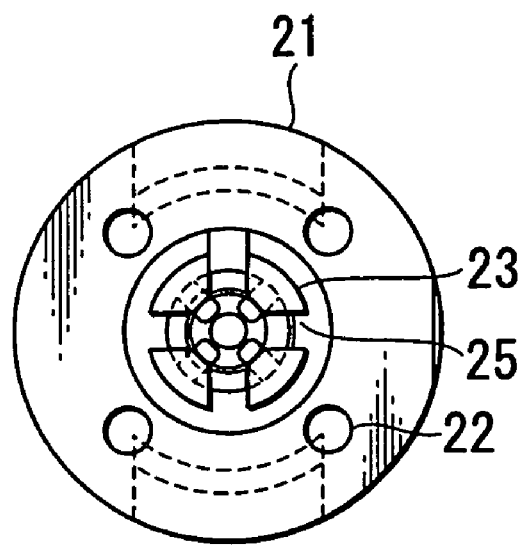
FIG. 5 is a bottom view of the clip according to the present invention.
Figure 7:
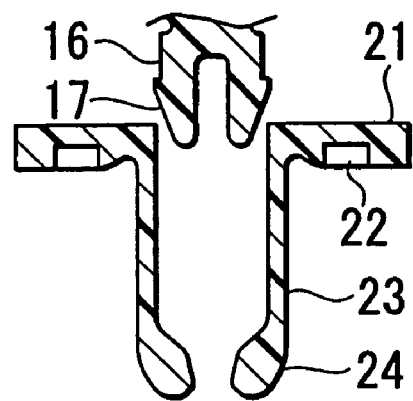
FIG. 7 is a sectional view taken along the line B—B in FIG. 4.

As shown in FIG. 7 which is the sectional view taken along the line B—B in FIG. 4, the ring portion 21 has a lower surface formed with a depression 22. As described in detail later, the top end of an ejector 36 can be engaged with the depression 22 to move the bush upward.

Figure 11:
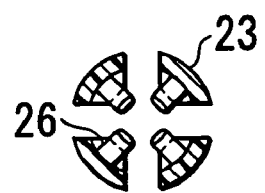
FIG. 11 is a sectional view taken along the line F—F in FIG. 1.

The leg portion 23 of the bush extends vertically downward from the lower surface of the ring portion 21. The leg portion 23 is formed with four slits 25 dividing the leg portion into four legs, and adapted to be bent outward by the pin 10 and the bush engaged with one another in the fastening position. As shown in FIG. 11 which is the sectional view taken along the line F—F in FIG. 1, each of the legs of the leg portion 23 has a rib-shaped section (rib 26). The slits 25 are also operable to prevent the pin 10 and bush 20 from rotating independently.

The leg portion 23 has a lower end formed as a thick-walled region 24. As described in detail later, in the fastening position, the thick-walled region 24 is brought into contact with the contact surface 16 of the pin 10 and expanded in diameter to keep the clip in the fastening position.

Figure 8:
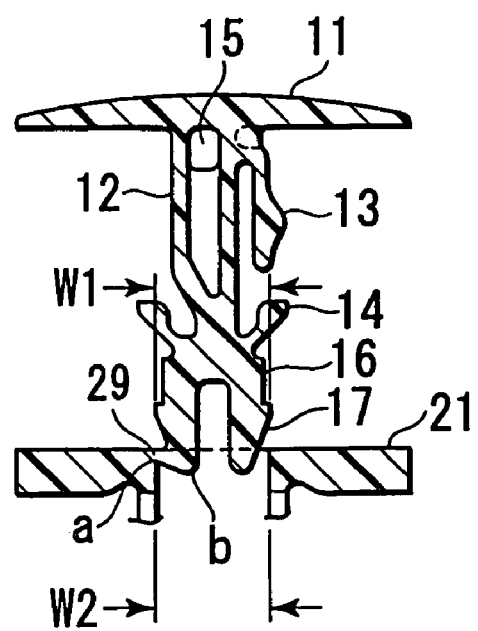
FIG. 8 is a sectional view taken along the line G—G in FIG. 4.

As shown in FIG. 8 which is the sectional view taken along the line G—G in FIG. 1, a notched thin-walled portion 29 is formed between the inclined portion 17 and the ring portion 21. In a molded state of the clip, the pin 10 and the bush 20 are connected with one another through the notched thin-walled portion 29. This positional relationship between the pin 10 and the bush 20 is hereinafter referred to as "molded position". In this embodiment, the notched thin-walled portion 29 is formed at a position designated by the reference code "a" in FIG. 8, and adapted to be broken adjacent to the inner surface of the ring portion 21 of the bush 20. Alternatively, the notched thin-walled portion may be formed at a position designated by the reference code "b". In this case, the pin 10 desirably has no fragment of the broken thin-walled portion. In this embodiment, the inclined portion 17 of the pin 10 has a maximum diameter W1 at the upper end thereof, and the diameter W1 is designed to be approximately equal to the inner diameter W2 of the leg portion 23 of the bush 20.

Figure 10:
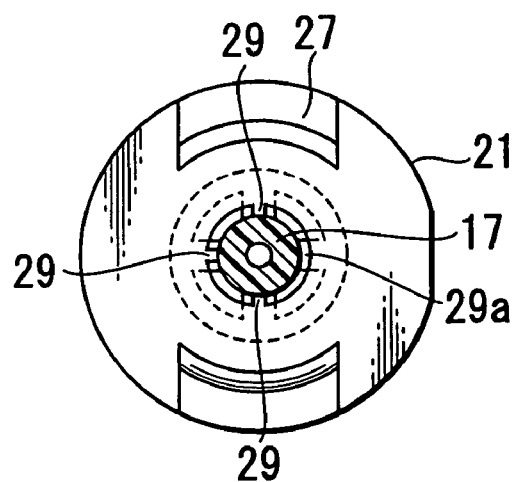
FIG. 10 is a sectional view taken along the line C—C in FIG. 1.

As shown in FIG. 10 which is the sectional view taken along the line C—C in FIG. 1, the notched thin-walled portion 29 is formed at three separate positions but omitted at a position designated by the reference numeral 29a. Because, if the notched thin-walled portion is formed at the position 29a in addition to the above three positions, the rough surfaces of the broken fragments of the notched thin-walled portions 29 can prevent the engagement pawl 13 from smoothly passing therethrough when it is forcedly inserted into the bush.

With reference to FIGS. 12 to 18, the process of forming the clip 8 of the present invention will be described below. A molding-die set 30 includes a fixed die 31, a sliding die 32, a movable die 34, an ejector 36, and a split die (core pin) 37 in the fixed die. The relationship between the fixed die 31 and the movable die 34 in the following description may be reversed, or the reference numbers 31 and 34 may indicates a movable die and a fixed die, respectively.

Figure 12:
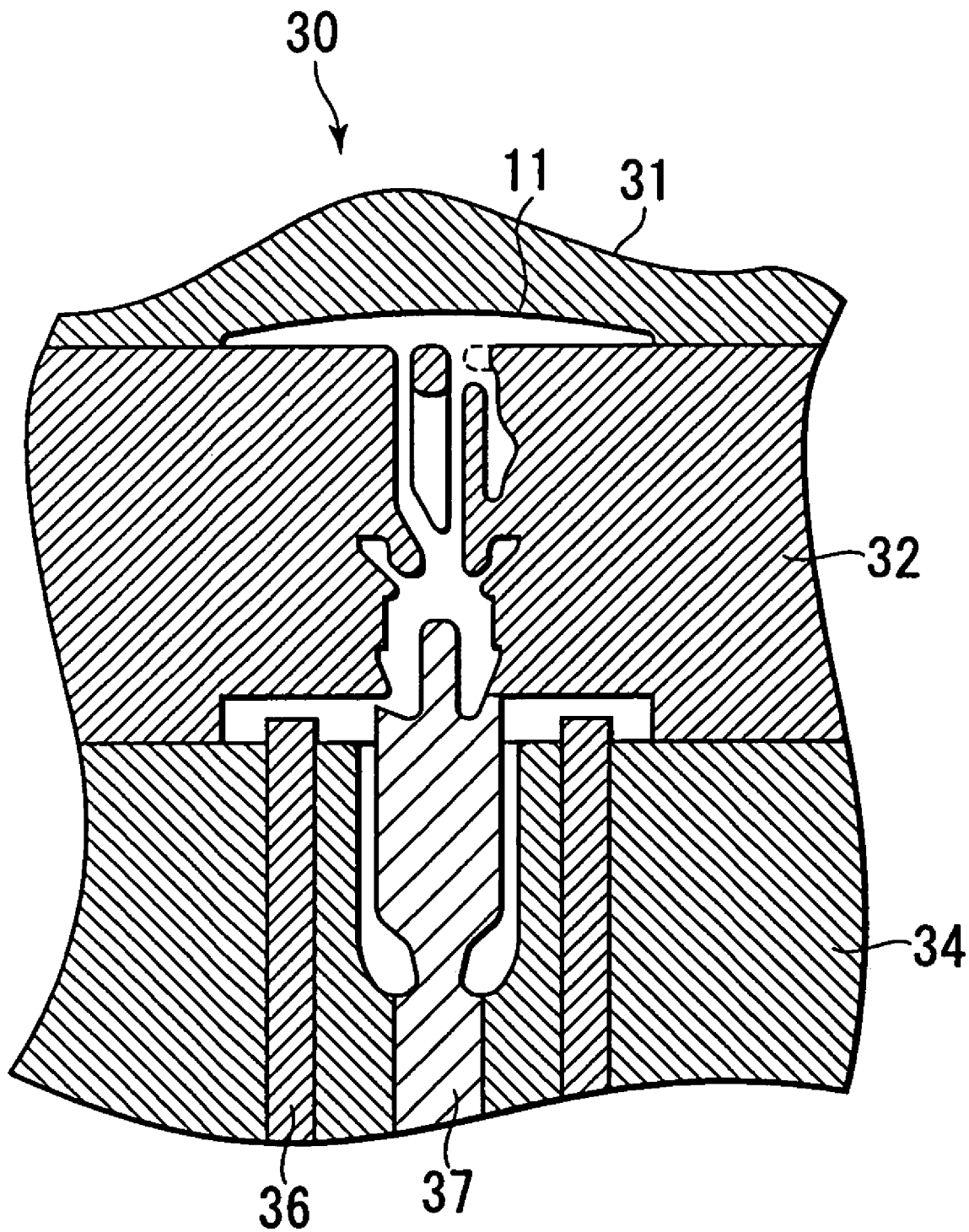
FIG. 12 is a sectional view showing the state after a molding-die set is closed and then a molten resin is injected (step 1).

FIG. 12 is a sectional view of the molding-die set including the fixed die 31, the sliding die 32, the movable die 34, the ejector 36, and the split die 37, in the state after the molding-die set is cramped or closed and then a molten resin is injected therein (step 1).

Figure 13:
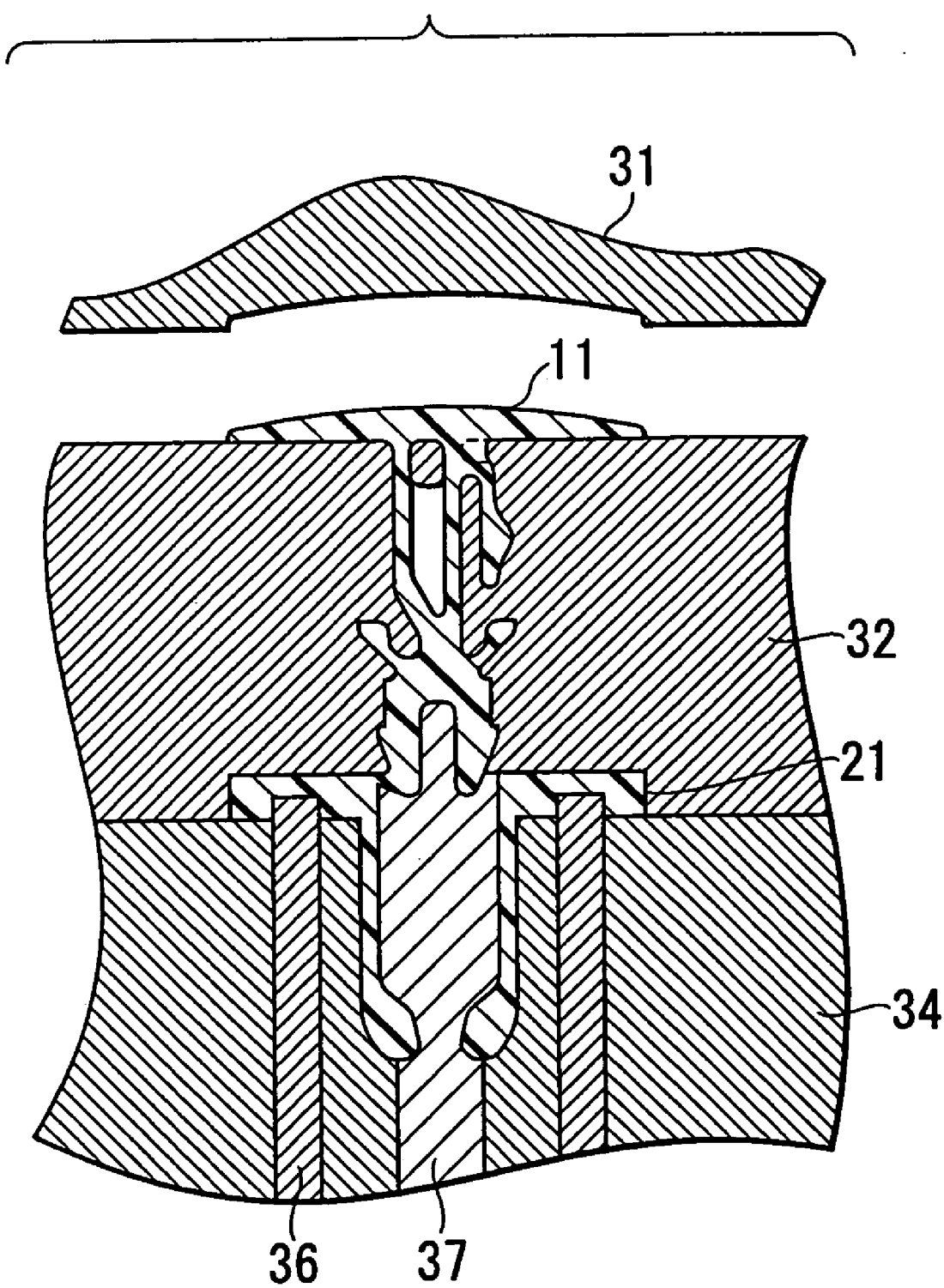
FIG. 13 is a sectional view showing the state when the molding-die set is opened (step 2).

FIG. 13 is a sectional view of the molding-die set showing the state when the molding-die set is opened to provide a given distance between the fixed die 31 and the slinging die 32 (step 2).

Figure 14:
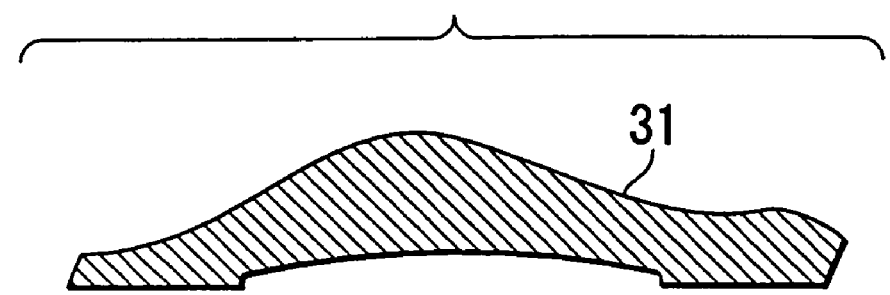
FIG. 14 is a sectional view showing the state after the molding-die set has been opened (step 3).
Figure 14:
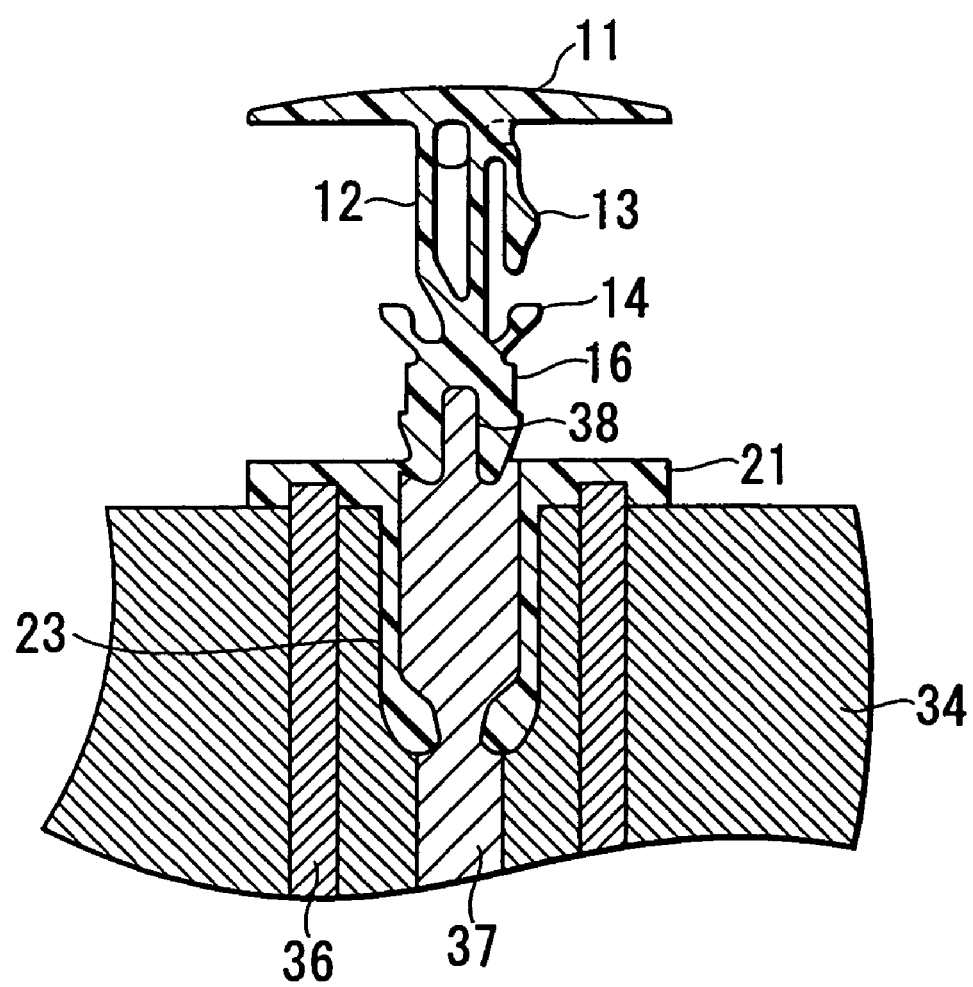

FIG. 14 shows the state after the molding-die set is further opened to provide a larger distance between the fixed die 31 and the slinging die 32, and then the sliding die 32 is opened to complete a process of opening the molding-die set. In this process, the split sliding die 32 is separately slid frontward and rearward (step 3). In this position, the pin 10 protrudes upward from the movable die 34. More specifically, the ring portion 21 of the bush 20 contacts the upper surface of the movable die 34, and the leg portion 23 is left within the movable die 34.

Figure 15:
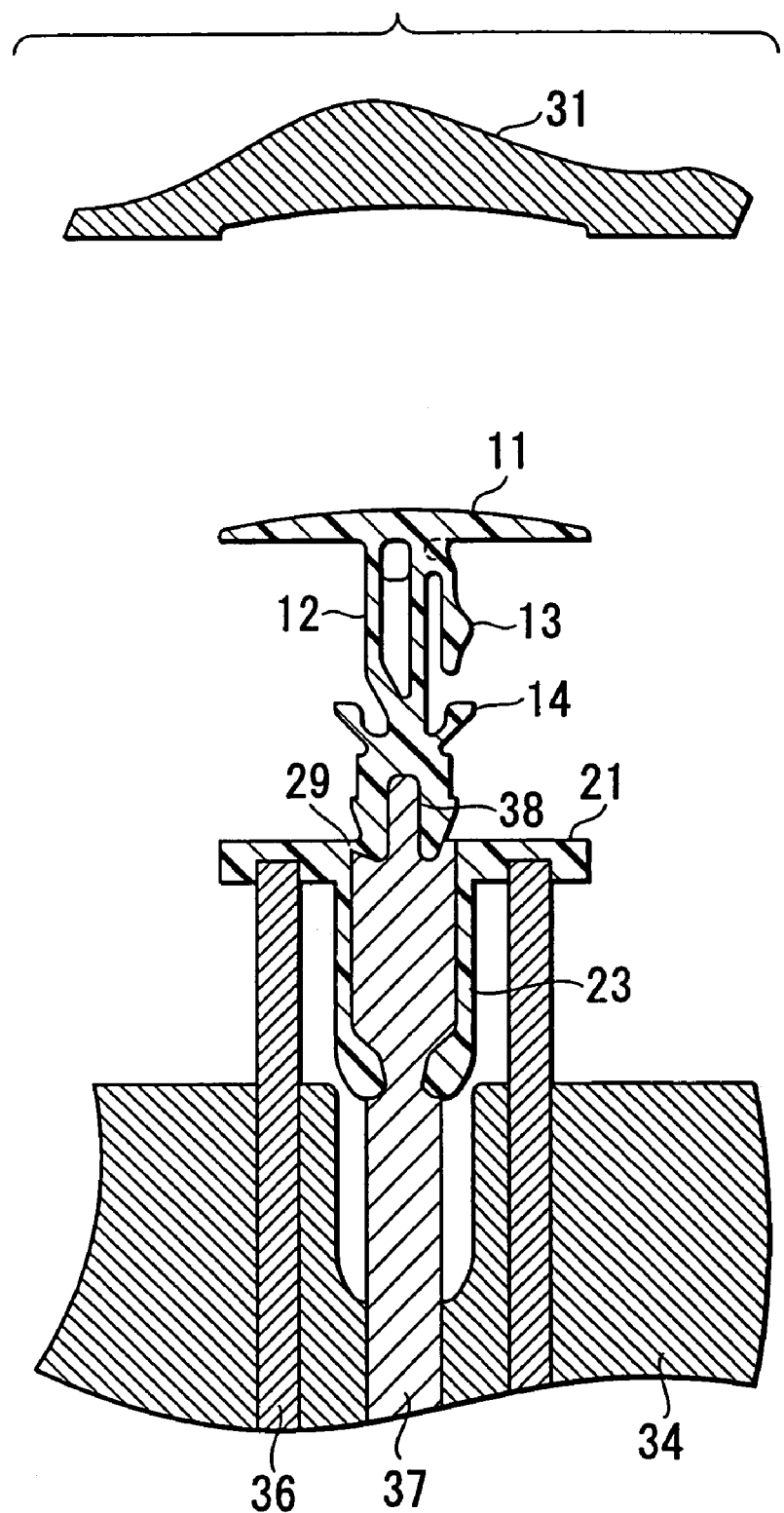
FIG. 15 is a sectional view showing the state an ejector and a core pin are protruded to move the clip upward (step 4).

FIG. 15 shows the state when the ejector 36 and the core pin 37 are moved upward or protruded to move the ring portion 21 upward from the movable die 34 (step 4). During this process, the pin 10 and the bush 20 are connected with one another through the notched thin-walled portion 29 to prevent the separation therebetween. Further, a projection 38 formed at the top end of the core pin 37 is inserted in the shank formed with the contact surface 16 to prevent the slant of the pin 10. If the pin 10 has a slant, the upper surface of the flange 11 will be improperly brought into contact with the fixed die 31 and damaged in an after-mentioned assembling process (step 6), resulting in deteriorated appearance or difficulty in implementation of the assembling process.

Figure 16:
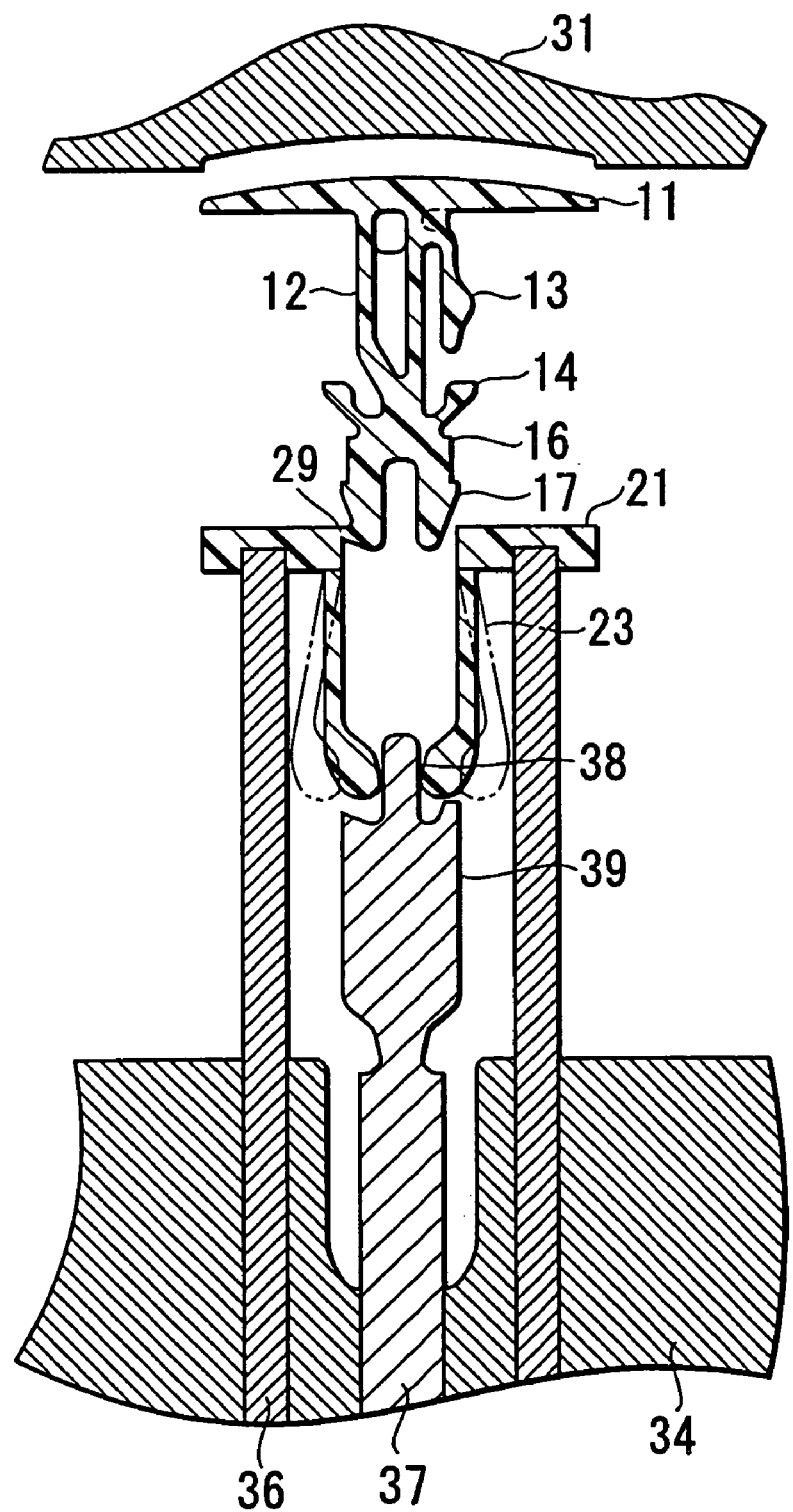
FIG. 16 is a sectional view showing the state when the core pin is pulled out of a leg portion of the clip (step 5).

FIG. 16 shows the state when the ejector 36 is further moved upward from the position as shown in FIG. 15 to pull out the core pin 37 from the leg portion 23 (step 5). In this process, the thick-walled region 24 is expanded in diameter by the large-diameter region 39 of core pin 37 to get out of the large-diameter region 39, and moved upward. For this purpose, an adequate space should be assured around the large-diameter region 39 to allow the leg portion 23, particularly the thick-walled region 24, to be sufficiently bent. Until the step 5, the pin 10 and the bush 20 are connected with one another through the notched thin-walled portion 29, or are in the molded position.

Figure 17:
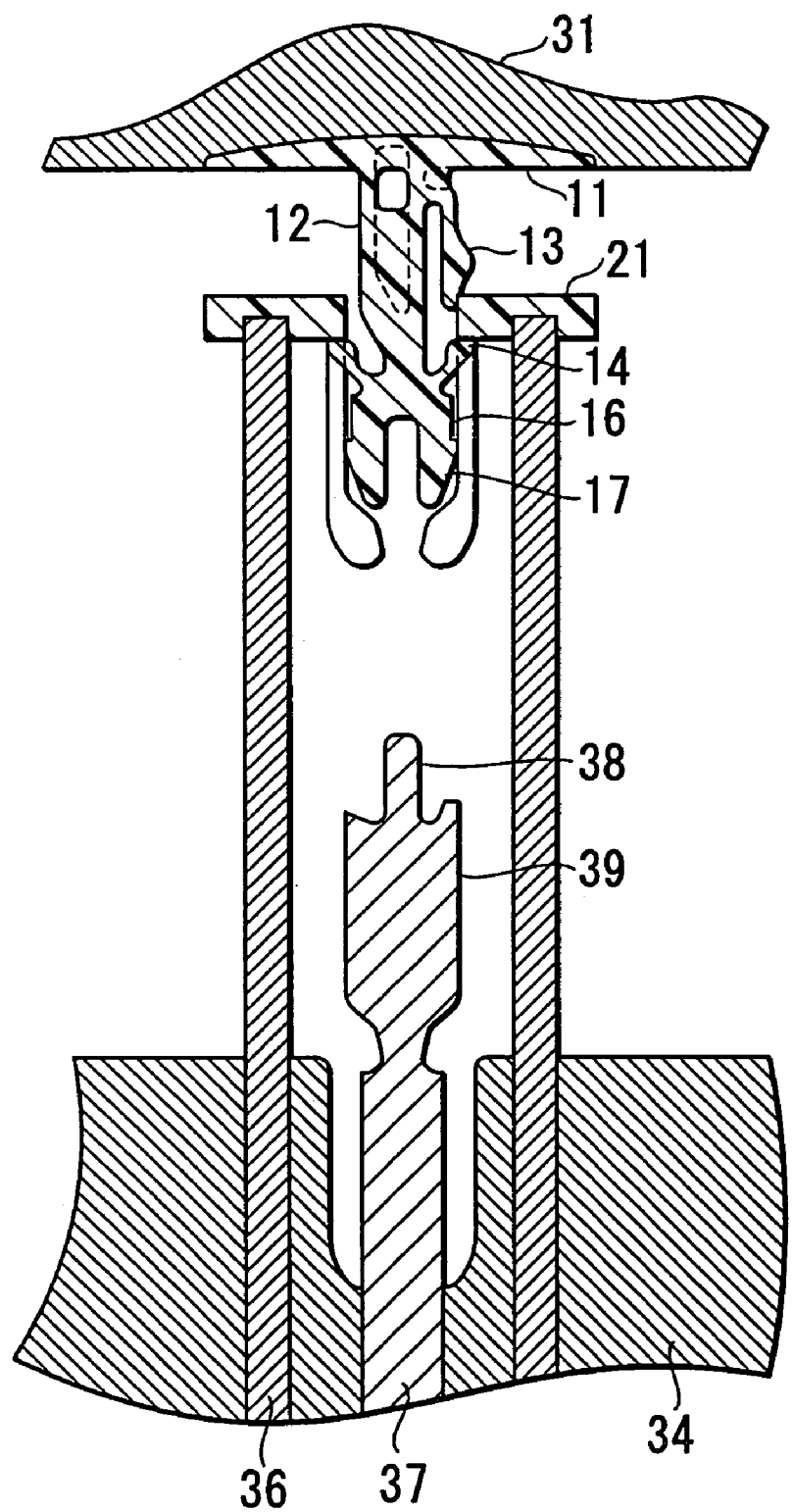
FIG. 17 is a sectional view showing a pin and a bush of the clip in an assembled position (step 6).

FIG. 17 shows the assembled position where the pin 10 and the bush 20 are assembled together after the notched thin-walled portion 29 is broken to separate the pin 10 and the bush 20 from one another (step 6). In this process, the flange 11 is brought into contact with the fixed die 31, and the ejector 36 is further moved upward to move the ring portion 21 upward. Thus, the notched thin-walled portion 29 formed between the inclined portion 17 and the ring portion 21 is broken to separate the pin 10 and the bush 20 from one another. Then, the ring portion 21 is moved beyond and above the coupling pawls 14, and held between the engagement pawl 13 and the coupling pawl 14 or kept in the assembled position.

Alternatively, the process may skip the step 6 while maintaining the state where the pin 10 and bush 20 are connected with one another through the notched thin-walled portion 29, and advance to a step 7 of releasing the clip 8 from the molding-die set.

Figure 18:
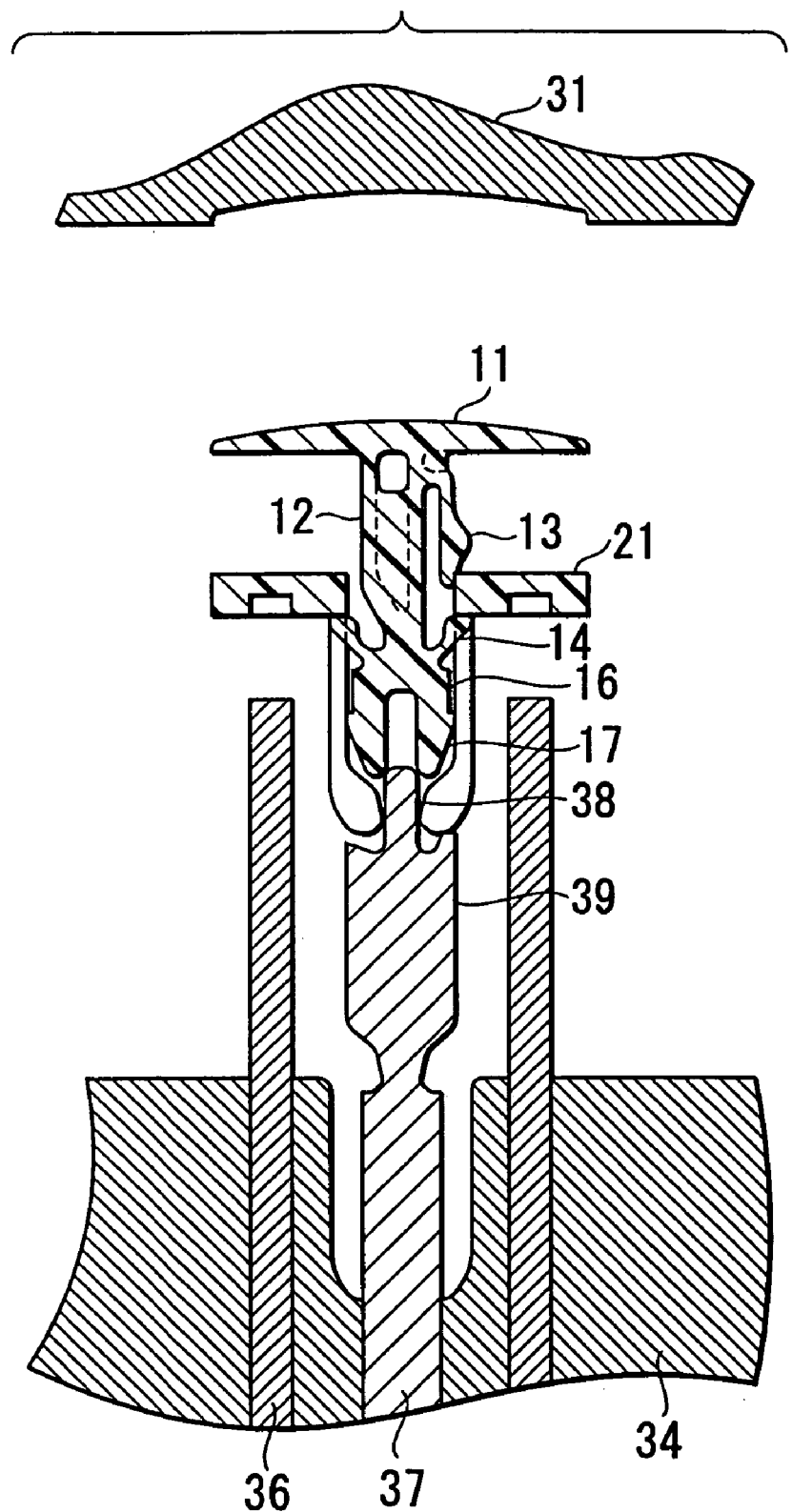
FIG. 18 is a sectional view showing the state when the ejector is moved downward to release the clip from the molding-die set (step 7).

FIG. 18 shows the state when the ejector 36 moves downwardly and the clip 8 is released from the molding-die set (step 7). Even after the clip 8 is released from the molding-die set, the ring portion 21 is held between the coupling pawl 14 and the engagement pawl 13 to keep the pin 10 and the bush 20 in the assembled position.

Figure 19:
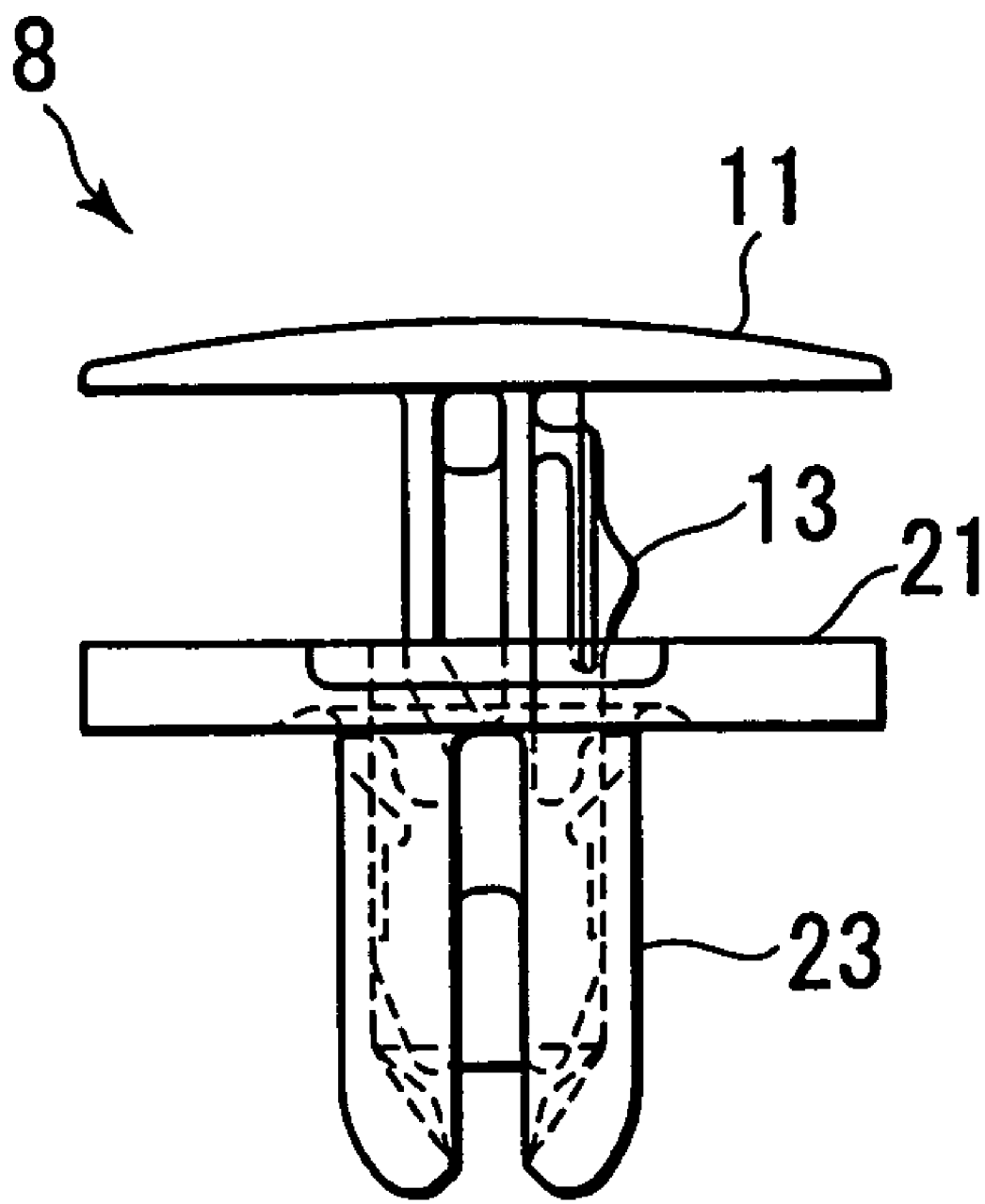
FIG. 19 is a front view showing the state after the pin and the bush in the assembled position are taken out of the molding-die set.

FIG. 19 shows the clip 8 with the pin 10 and clip 20 in the assembled position after it is taken out of the molding-die set. The relative positional relationship between the pin 10 and the bush 20 is the same as that in FIG. 18.

With reference to FIGS. 20A and 20B, an operation of detaching the clip attached to the plate members. FIG. 20A is a sectional view showing the state after the clip is attached to the plate members to fasten them together (fastening position). In the fastening position, the thick-walled region 24 is expanded in diameter by the contact surface 16 engaged therewith to fasten the plate members together. As shown in FIG. 10 which is the sectional view taken along the line C—C in FIG. 2, the outer peripheral region of the ring portion 21 is partially lowered to define the prying slot 27 between the outer peripheral region and the flange 11 in the fastening position. The pin 10 and the bush 20 attached to the pate members to fasten them together can be detached by inserting a flat-head screwdriver 40 into the prying slot 27. In this embodiment, the prying slot 27 is formed at two positions. However, the present invention is not limited to this embodiment, but any suitable number of prying slots may be formed.

FIG. 20B is a sectional view showing the state after the clip is released from the fastening position. For detaching the clip 8, the thick-walled region 24 is released from the engagement with the contact surface 16, and the contact surface 16 and inclined portion 17 are moved upward after passing through the thick-walled region 24. The thick-walled portion 24 expanded in diameter will return to its original state having a non-expanded diameter. In this manner, the fastening between the plate members 4 and 5 can be released. When the fastening is released, the top end of the coupling pawl 14 of the pin 10 is stopped at the position (assembled position) where it contacts the lower surface of the ring portion 21 of the bush 20. In this position, the engagement pawl 13 gets out of the upper surface of the ring portion 21 to support the upper surface of the ring. This prevents the separation between the pin 10 and the bush 20 to allow the clip to be stored while keeping them in the assembled position. This clip 8 can be reused in future.

As mentioned above, according to the present invention, the pin and the bush can be integrally molded in a single molding-die set.

In addition, the pin and the bush can be assembled together in the molding-die set to eliminate the need for assembling them in a subsequent process.

What is claimed is:

1. A method of manufacturing a clip, said clip having a female member and a male member, said female member having a ring portion and a plurality of legs, said plurality of legs being operable to be expanded in diameter to fasten a first component to a second component when said male member is pushed into said female member, said male member having a shank extending downwardly from a flange, an engagement pawl extending from said shank, and a coupling pawl extending from said shank from a position below said engagement pawl, said method comprising:
    closing a molding die set having a first mold section, a second mold section, a third mold section, a core member, and an ejector together defining a mold cavity;
    injecting a molten resin into said mold cavity to form said male and female members and a frangible portion therebetween;
    separating said first mold section from said second mold section; and
    extending said ejector to drive said clip upward such that said frangible portion is severed and said flange of said male member contacts said first mold section and drives said female member relative to said male member until the engagement pawl engages a top portion of said ring portion and said coupling pawl engages an underside surface of said ring portion.

2. The method according to claim 1, further comprising:
    extending said core member to disengage said clip from said ejector.

3. A method of manufacturing a clip, said clip having a bush and a pin, said bush having a ring portion and a plurality of legs, said plurality of legs being operable to be expanded in diameter to fasten a first component to a second component when said pin is pushed into said bush, said pin having a shank extending downwardly from a flange, an engagement pawl extending from said shank, and a coupling pawl extending from said shank from a position below said engagement pawl, said method comprising:
    closing a molding die set having a first mold section, a second mold section, a third mold section, a core pin, and an ejector together defining a mold cavity;
    injecting a molten resin into said mold cavity to form said bush and pin and a frangible portion therebetween;
    separating said first mold section from said second mold section;
    removing said second mold section;
    extending said core pin and said ejector to separate said clip from said third mold section;
    retracting said core pin from said clip;
    extending said ejector to drive said clip upward such that said flange of said pin contacts said first mold section; and
    further extending said ejector to sever said frangible portion and drive said bush relative to said pin until the engagement pawl engages a top portion of said ring portion and said coupling pawl engages an underside surface of said ring portion.

4. A method of manufacturing a clip, said method comprising:
    closing a molding die set having a first mold section, a second mold section, a third mold section, a core member, and an ejector together defining a mold cavity;
    injecting a molten resin into said mold cavity to form said clip, said clip having a female member, a male member and a thin-walled portion therebetween, said thin-walled portion configured to hold the male member in relation to the female member upon separation of the first mold section from the second mold section, said female member having a ring portion and a plurality of legs, said plurality of legs being operable to be expanded in diameter to fasten a first component to a second component when said male member is pushed into said female member, said male member having a shank extending downwardly from a flange, an engagement pawl extending from said shank, and a coupling pawl extending from said shank from a position below said engagement pawl;
    separating said first mold section from said second mold section, exposing said male portion; and
    protruding said ejector to drive said clip upward such that said flange of said male member contacts said first mold section and said first mold drives said male member relative to said female member to break the thin-walled portion.

5. The method according to claim 4, further comprising protruding said ejector until the engagement pawl engages a top portion of said ring portion and said coupling pawl engages an underside surface of said ring portion.

6. The method according to claim 4, further comprising:
    extending said core member to disengage said clip from said ejector and position the male portion within the female portion.

7. A method of manufacturing a clip, comprising:
    closing a molding die set having a first mold section, a second mold section, a third mold section, a core pin, and an ejector together defining a mold cavity;
    injecting a molten resin into said mold cavity to form said clip, said clip having a bush and a pin coupled by a thin-walled portion, said bush having a ring portion and a plurality of legs, said plurality of legs being operable to be expanded in diameter to fasten a first component to a second component when said pin is pushed into said bush, said pin having a shank extending downwardly from a flange, an engagement pawl extending from said shank, and a coupling pawl extending from said shank from a position below said engagement pawl;
    separating said first mold section from said second mold section;
    removing said second mold section;
    extending said core pin and said ejector to separate said clip from said third mold section;
    retracting said core pin from said clip;

extending said ejector after retracting said core pin to drive said clip upward such that said flange of said pin contacts said first mold section to fracture the thin-walled portion; and further extending said ejector to drive said bush relative to said pin until the engagement pawl engages a top portion of said ring portion and said coupling pawl engages an underside surface of said ring portion.

8. The method according to claim 7, further comprising retracting the ejector to release the clip from the mold.

* * * * *